May 2, 1967     T. MARINER     3,317,031

VIBRATOR

Filed July 13, 1965     2 Sheets-Sheet 1

INVENTOR
THOMAS MARINER

BY *Stephen S. Hunting*
ATTORNEY

May 2, 1967 T. MARINER 3,317,031
VIBRATOR
Filed July 13, 1965 2 Sheets-Sheet 2

INVENTOR
THOMAS MARINER

BY
ATTORNEY

United States Patent Office 3,317,031
Patented May 2, 1967

3,317,031
VIBRATOR
Thomas Mariner, Mount Joy, Pa., assignor to Armstrong Cork Company, Lancaster, Pa., a corporation of Pennsylvania
Filed July 13, 1965, Ser. No. 471,697
2 Claims. (Cl. 198—220)

This invention relates to vibratory apparatus and more particularly, to node-free vibratory apparatus.

Problems have existed in the areas of vibratory apparatus due to nodal patterns and resultant dead spots in surfaces to be vibrated. In such cases, if the particular apparatus were used to move or modify the condition of granular material, for example, such material would not be distributed evenly across the vibrating surface due to the dead spots thereon. In other words, certain areas of such a surface would have no excitation, and the material thereon would not be moved or vibrated.

The device of the present invention avoids these problems by providing node-free vibration across the entire surface, body, or mass to be vibrated. The node-free operation results from building the surface, body, or mass to be vibrated to have a high flexural stiffness to mass ratio so that the fundamental, natural, flexural or bending frequency thereof is greater than that frequency at which said surface, body, or mass will be vibrated.

Accordingly, an object of the present invention is to provide node-free vibratory apparatus.

Another object of the present invention is to provide node-free vibratory apparatus wherein an object to be vibrated is vibrated at a frequency less than its fundamental, natural, flexural frequency.

Other objects of the present invention will be apparent from the description hereafter with reference to the drawings wherein FIGURE 1 is a side view in elevation of an embodiment of vibratory apparatus according to the present invention;

Figure 1:
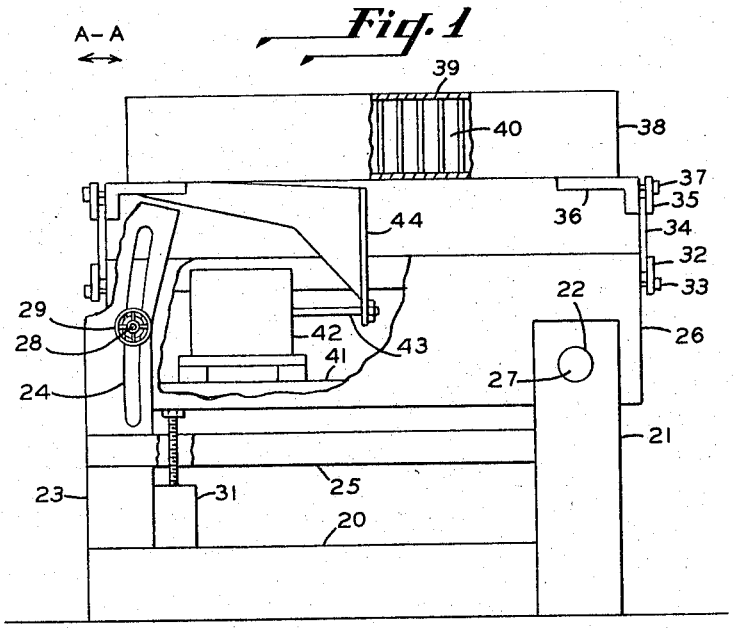
Figure 2:
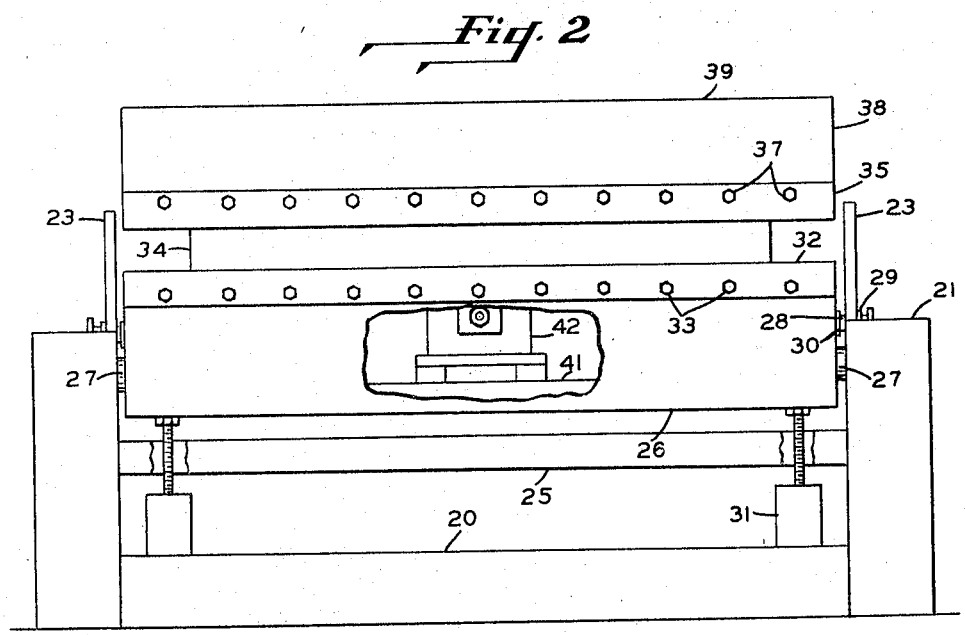
FIGURE 2 is a front view in elevation of the apparatus shown in FIGURE 1.

Referring to FIGURES 1 and 2, there is shown a base 20 having a pair of spaced, upright posts 21 located on either side of said base 20 adjacent one end thereof. Posts 21 have aligned openings 22 in their upper portions. A pair of guide members 23 are located on either side of base 20 adjacent the end thereof opposite posts 21. Guide members 23 have arcuate guide slots 24 located in their upper portions. Cross braces 25 interconnect posts 21 and guide members 23 to strengthen and rigidify the composite assembly comprising these members along with base 20.

A bed 26 having substantial mass and rigidity is located between said posts 21 and guide members 23. Bed 26 has a pair of aligned stub shafts 27 extending outwardly from either side thereof. Shafts 27 are journaled in openings 22 in posts 21. Thus, bed 26 is supported for pivotal movement with respect to base 20 by means of posts 21. A pair of rods 28 extend outwardly from either side of bed 26. Rods 28 are aligned with guide slots 24 and extend therethrough. A hand wheel actuated locking plate 29 is threadedly engaged on the outer end of each rod 28. A plate 30 is located on each side of bed 26 in surrounding relationship to rod 28. Thus, each hand wheel locking device 29 may be advanced on its associated rod 28 to cause bed 26 to be locked in a given position due to the frictional engagement between the locking plate 29, guide members 23, and plates 30.

Underlying bed 26 on either side thereof are a pair of jackscrew mechanisms 31 which may be utilized to raise or lower the bed when the hand wheel locking devices 29 are located in their unlocked positions. It is apparent that the extent of adjustment of the bed 26 with respect to base 20 is governed by the length of the guide slots 24 which may be lengthened or shortened should conditions require.

A pair of clamping plates 32 are secured to bed 26 by means of bolts 33, one plate 32 being located on either end of bed 26. A spring blade 34 is secured in an upright position at each end of bed 26 between clamping plate 32 and the associated end of bed 26. The upper end of each spring blade 34 is held between a clamping plate 35 and a support bracket 36 by bolts 37.

Support brackets 36 are secured to the underside of body 38 which is in the form of a rectangular box having a substantially planar, upper surface plate 39. A rigid, honeycomb core is secured to the underside of surface plate 39 and to the peripheral and lower walls of body 38. If desired the lower, central portion of the lower wall of body 38 may be open.

It is desirable to form body 38 to have a high flexural stiffness to mass ratio. These characteristics can be obtained by forming the entire body 38 including honeycomb core 40 of aluminum. The honeycomb core may be secured to the underside of surface plate 39 and/or to the remaining parts of body 38 by conventional means such as an epoxy adhesive, for example. Further, the support brackets 36, clamping plate 35, and bolts 37 may also be of aluminum.

As shown in the drawings, the body 38 on its supports including spring blades 34 has a neutral or natural position of rest. When body 38 is moved, the spring blades 34 tend to restore themselves and body 38 to this neutral or natural position of rest. It is necessary that the fundamental, natural, flexural frequency of the body 38 as it may be affected by its support means and/or natural position of rest restoring means including any constraining effects attributed to the supporting structure and/or natural position of rest restoring means be greater than the frequency at which said body is vibrated to avoid nodes or dead spots thereon.

Bed 26 contains web 41 on which a conventional vibrator motor 42 is firmly connected or secured by conventional mounting means. Vibrator motor 42 has an outwardly extending actuating rod 43. A link 44 interconnects rod 43 and one of the support brackets 36. Therefore, when vibrator motor 42 is actuated, vibratory motion will be transmitted by means of rod 43, link 44, and bracket 36 to body 38. This vibratory motion will cause body 38 to oscillate with respect to bed 26 in a path as determined by the flexure of spring blades 34 in the direction as indicated by the arrows A—A shown in FIGURE 1.

As noted above, in order to prevent nodes or dead spots from appearing in body 38 during its movement, it is necessary that the frequency of vibration which is transmitted to said body 38 be less than the fundamental, natural, flexural frequency thereof in its support and/or natural position of rest restoring environment. Further, the optimum condition of operation occurs when the body 38, support brackets 36, clamping plates 35, and spring blades 34 comprise a mass-spring system which has a natural frequency less than the fundamental, natural, flexural frequency of the body 38 as it may be affected by its support means and/or natural position of rest restoring means and when this mass-spring system is vibrated in the area of and preferably at its natural frequency of vibration. In this manner, nodes and dead spots in body 38 will be avoided, and the power requirements for vibrating such a mass-spring system will be substantially less than in that vibratory apparatus heretofore known. The bed 26 and the remainder of the supporting structure therebelow, of course, must be generally rigid and massive enough so that they will not be substantially affected or moved by vibrator motor 42 or the action of the mass-spring system comprising body 38 and spring blades 34 noted above in this particular embodiment. Since the power requirements of the mass-spring system noted above are quite low, the rigidity and mass of the bed 26 and the remainder of the support structure therebelow is not required to be nearly as great as that which would be expected in normal vibratory apparatus.

In a modified embodiment of the present invention it is contemplated that the bed include a second mass-spring system similar to that already described and driven at the same frequency as, but out of phase with, the original mass-spring system so as to permit the use of supporting structures of lower mass and rigidity.

A further modification of the present invention may take the form of a body supported by relatively frictionless means such as ball bearings, for example, and resilient means such as springs, for example, associated with said body, which restore the body to a particular neutral or natural position of rest. In this case, the body, support means, and natural position of rest restoring means would comprise a mass-spring system. As in the other embodiments, the body as it may be affected by the support means and/or natural position of rest restoring means has a fundamental, natural, flexural frequency of vibration and should be vibrated at a frequency less than this fundamental, natural, flexural frequency of vibration. Further, the natural frequency of the mass-spring system comprising the body, support means, and natural position of rest restoring means, should be less than the fundamental, natural, flexural frequency noted above, and this mass-spring system should be vibrated in the area of its natural frequency for optimum operation.

Figure 3:
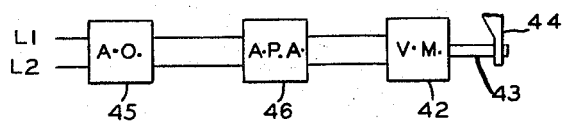
FIGURE 3 is a diagram of a manual control circuit which may be used with the apparatus of FIGURES 1 and 2.

Referring now to FIGURE 3, there is shown a diagram of control components which may be used to manually control the vibrator motor 42. A conventional audio oscillator 45 may be connected to a suitable source of power L1 and L2. Oscillator 45 contains conventional control members such that the output frequency and amplitude thereof may be adjusted. The output of audio oscillator 45 is conducted to a conventional audio power amplifier 46 which may contain conventional control members including a gain control. The output signal from amplifier 46 is conducted to vibrator motor 42 which in turn transmits vibratory motion to body 38 in accordance with the selected frequency and amplitude. The operator of the device may visually inspect the motion of body 38 and make suitable adjustments in the oscillator 45 and amplifier 46 to obtain the desired and/or optimum conditions of operation as outlined above. For example, the vibrating apparatus shown in FIGURES 1 and 2 may be used in the floor covering industry to level and/or uniformly distribute granular mix composition and/or chips. The operator of the device will be able to visually inspect the movement of particles on the vibrating surface plate 39 in a manner such that the optimum condition of vibratory movement of body 38 will be readily apparent upon adjustment of the control apparatus shown in FIGURE 3. The vibratory apparatus shown in FIGURES 1 and 2 will also provide suitable operation when the particles or chips to be vibrated are located on top of a carrier of backing material, for example. In this case, the visual inspection and adjustment of the control circuit shown in FIGURE 3 may be performed in the same manner. It is to be understood, however, that the amount and character of the particles, carrier, or other material which is supported on body 38 will change the characteristics of the mass-spring system formed by the material, body, and resilient support system such that suitable adjustment in the control apparatus may be made to maintain the system operating at the optimum condition. Thus, the material to be vibrated actually becomes a part of the mass-spring system when it is supported by the body. It is to be noted that the examples of materials or objects to be vibrated set forth herein are merely illustrative of a few applications and that the vibratory system disclosed in this case may be used to vibrate, convey, or act upon many different types of materials.

Figure 4:
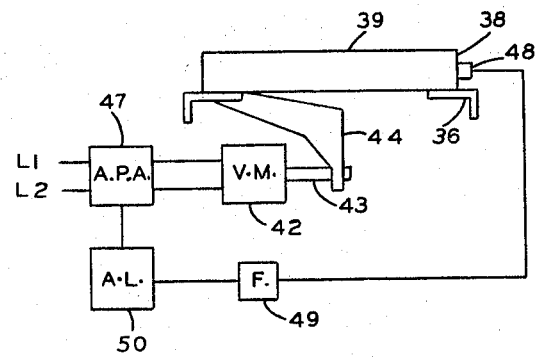
FIGURE 4 is a diagram of automatic control system which may be used with the apparatus shown in FIGURES 1 and 2.

Referring to FIGURE 4, there is shown an automatic control system for the apparatus shown in FIGURES 1 and 2. In this system, a conventional audio power amplifier is connected to a suitable source of power L1 and L2. The output of this amplifier is connected to vibrator motor 42. A conventional velocity pickup or accelerometer 48 is secured to body 38. Pickup 48 may be connected to filter 49 which selectively passes frequencies in the area of the natural frequency of the mass-spring system. As a safety precaution, an adjustable amplitude limiter 50 may be inserted in the circuit between filter 49 and amplifier 47. With this control system, it is apparent that the motion of body 38 will cause pickup 48 to send a suitable signal through the filter 49 and amplitude limiter 50 to the amplifier 47 to actuate vibrator motor 42. Thus, the motion of body 38 actually excites the driving mechanism of vibrator motor 42. In this manner the natural frequency of the mass-spring system and the actuating frequency of the vibrator motor would correspond identically, even in the presence of the disturbing effects such as variable loading or other influences which would modify the natural frequency of the mass-spring system. This regenerative arrangement assures mutual resonance of driving and driven bodies and therefore assures a large amplitude of motion for a given driving energy within the limits allowed by the amplitude limiter 50 and/or gain of the amplifier.

Therefore, the present invention provides node-free vibration in a body which is associated with resilient natural position of rest restoring means or resilient support means, if said body has a fundamental, natural, flexural frequency as it may be affected by its natural position of rest restoring means and/or support structure, if such support structure is separate from said natural position of rest restoring means, which is greater than the frequency at which said body is vibrated. Further, the resilient support means or resilient natural position of rest restoring means reduce the power required to vibrate the body. In the optimum case, the body and its associated resilient support means or resilient natural position of rest restoring means and associated support means if separate therefrom may be formed to comprise a mass-spring system having a natural frequency which is less than the fundamental, natural, flexural frequency of the body as it may be affected by its support and/or natural postion of rest restoring structure, and this system may be vibrated in the area of and preferably at its natural frequency.

It is to be understood that the present invention is not limited to the specific embodiments shown and described. The specific material of construction, location, relative size, shape, etc. of the various components may be modified or adjusted. The particular adjusting mechanism of the vibrating mechanism may be varied to provide for a greater or lesser amount of angular adjustment of the vibrating body. The pivot point for the bed may be relocated in other positions such as in the center of the bed, for example. In such a case, the force required to pivot or tilt the bed would be less than that which is required in the embodiment illustrated in FIGURES 1 and 2. The particular configuration and location of the support brackets and/or resilient supports may be varied to obtain different amounts of horizontal and vertical components of motion of the body.

The location and orientation of the vibrator motor as well as the nature and position of the connecting link may be varied. If desired, the link may be omitted and the vibrator motor connected directly to the body or system to be vibrated. The particular mode or modes and direction of vibratory motion may be varied by varying the type and location of drive motor means and support means. For example, it may be desired to mount a body on coil springs and obtain vertical, translatory, or rotational motion by suitable selection of the location and type of the drive member. Further, the type, location, and orientation of the pickup may be varied to respond preferentially to a particular mode or modes of vibration.

It is to be understood that various types of drive motor or means may be utilized including, but not limited to, those of the magnetic, eccentric, electrical, etc., types.

Although the particular body disclosed herein comprises a box which is stiffened by a honeycomb core, other structures may be substituted therefor if such other structures have a flexural stiffness to mass ratio such that the fundamental, natural, flexural frequency of any such structure as it may be affected by its support means and/or natural position of rest restoring means is greater than the frequency at which said structure is to be vibrated. For example, a plywood sheet stiffened by bars secured thereunder may be used as the vibratory body. Further, other types of resilient supports, resilient materials, and forms of springs may be utilized in lieu of the spring blades shown in the drawings. For example, coil springs, rubber cylinders, entrapped air springs, etc. could be used, and/or spring blades may be of plastic or other non-metallic materials.

The term "mass-spring" system as used herein is not to be construed to limit the support means to a particular spring support structure but is meant to be broad enough to cover other types of resilient support structure as noted noted above. The term "mass-spring" system as it appears herein is used in the same manner as it is used in the standard physics and/or engineering texts.

Various modifications of the present invention will occur to those skilled in the art without departing from the spirit and scope of the invention as defined in the claims.

I claim:
1. A vibratory apparatus comprising a base, a vibratory member disposed in spaced relationship to said base, said vibratory member having a planar upper surface and a high flexural stiffness to mass ratio, said vibratory member further being comprised of a substantially rigid honeycomb structure secured between two rigid plates, resilient support means for said vibratory member extending therefrom to said base, said vibratory member, as it may be effected by said resilient support means, having a fundamental, natural, flexural frequency of vibration, said vibratory member and said resilient support means forming a mass-spring system having a natural frequency of vibration less than said fundamental, natural, flexural frequency of said vibratory member, and drive means separate from said resilient support means and attached to said base for vibrating said mass-spring system at a frequency less than said fundamental, natural, flexural frequency of said vibratory member whereby substantially node-free vibration is maintained in said vibratory member.

2. A vibratory apparatus according to claim 1 wherein said resilient support means for said vibratory member comprises spaced parallel spring blades and wherein said drive means imparts vibratory motion to said mass-spring system in a direcion which is transverse to said spring blades.

References Cited by the Examiner

UNITED STATES PATENTS

| | | | |
|---|---|---|---|
| 657,393 | 9/1900 | Buss | 198—220 |
| 2,239,765 | 4/1941 | Wurzbach et al. | 198—220 |
| 2,243,936 | 6/1941 | Wurzbach et al. | 198—220 |
| 2,358,876 | 9/1944 | Overstrom | 198—220 |
| 2,705,070 | 3/1955 | Carrier et al. | 198—220 |
| 3,199,664 | 8/1965 | Baker | 198—220 |
| 3,216,556 | 11/1965 | Burgess | 198—220 |

References Cited by the Applicant

UNITED STATES PATENTS

| | | |
|---|---|---|
| 1,672,807 | 6/1928 | Etzel. |
| 2,287,223 | 6/1942 | Baird. |
| 2,287,880 | 6/1942 | Hittson. |
| 2,669,344 | 2/1954 | Flint. |
| 2,997,158 | 8/1961 | Moskowitz et al. |
| 3,087,603 | 4/1963 | Petrea. |
| 3,130,831 | 4/1964 | Musschoot. |

EVON C. BLUNK, *Primary Examiner.*

M. L. AJEMAN, *Assistant Examiner.*